Nov. 14, 1967

M. J. H. STAAR

FRAME FOR SUPPORTING A TRANSPARENCY AND SOUND REPRODUCING MATERIAL

Filed April 22, 1964

3,352,204

3,352,204
Patented Nov. 14, 1967

3,352,204

FRAME FOR SUPPORTING A TRANSPARENCY AND SOUND REPRODUCING MATERIAL

Marcel Jules Hélène Staar, 4 Ave. Sylviane, Rhode-Saint-Genese, Belgium

Filed Apr. 22, 1964, Ser. No. 361,746
Claims priority, application Belgium, Apr. 29, 1963, 631,650
7 Claims. (Cl. 88—28)

This invention relates to frames for supporting transparencies while being projected, and an object of the invention is to provide an improved support frame.

In known support frames for transparencies, a sound system for providing a sound accompaniment during the projection of the transparencies is held in a fixed position with respect to the transparency, and a movable recording and playback head passes the sound zone. This entails a reduced recording capacity, and requires very accurate positioning to insure that the path covered by the said head and by the recorded tracks, or by the tracks it is required to record, are in absolute register. This rules out the possibility of recording with portable means, and also the possibility of recordings made when a photograph is taken.

According to the present invention, a frame for supporting transparencies while being projected comprises an aperture for a transparency, and a housing for a recording band or tape, the said housing being of a shape such that the recording band or tape can be freely pushed into the housing and pulled out of the same simply by the driving action of elements outside of the frame, one motion being provided for both the entry and the exit of the band or tape.

The sound band or tape is movable while the recording and playback head remains stationary. Also, each tape corresponding to a transparency can move while the transparency remains stationary, and there is therefore complete independence and flexibility of operation between the band or tape and the transparency with a considerable storage capacity for the band or tape. No great precision is required between the position of the recording band or tape and the transparency.

The use of a single support for both the transparency and the tape or band, and hence an interchangeable commentary is an advance over methods in which the commentaries are grouped on a spool for a set of transparencies, without any facility for rapid revision, such recording also being limited to a specific projection sequence.

In order that the invention may be more readily understood, some embodiments of the invention will be described hereinafter with reference to the accompanying drawings, wherein:

FIGS. 1, 2 and 3 each are elevational views of separate embodiments;

Figure 1:
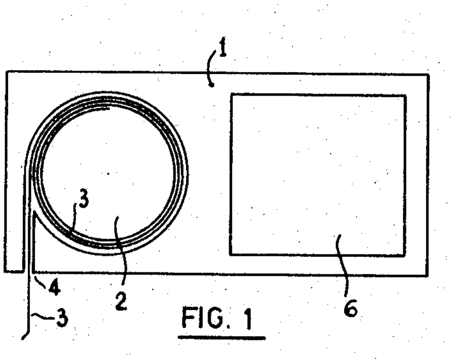

In FIG. 1 a support frame for the projection of transparencies is shown at 1, the frame including a housing or aperture 6 for a transparency which is to be projected, and a housing or cavity 2 of a form such that a recording band or tape 3 of sufficient rigidity and of a given length can freely be pushed into the housing 2 and pulled out of the same simply by the driving action of elements (not shown) outside the frame.

A passage 4 extends from an edge of the frame 1 to the cavity 2 and tangentially to the periphery of the said cavity, to enable the band or tape 3 to be unreeled and reeled for its playback by a recording head (not shown) outside the common support frame 1. The passage 4 is used for both the entry and the exit of the band or tape into and out of the support frame 1.

The housing or cavity 2 is substantially circular, and the tape or band 3 co-operates with the substantially circular inner periphery of the cavity 2, so as to be wound in concentric turns.

Figure 2:
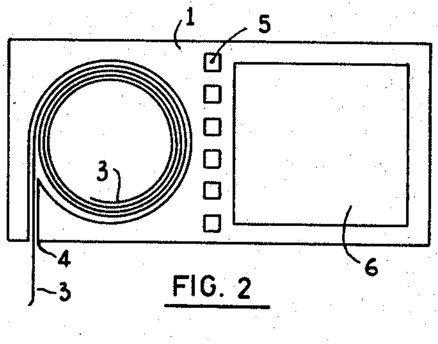

In the embodiment shown in FIG. 2, in order to obviate any transfer of heat from the projector to the band or tape 3, perforations 5 may be formed between the parts of the frame 1 provided with the aperture 6 for the transparency and the housing 2 for the sound tape. Instead of such perforations, an insulating material may be interposed, or else the support may be reduced in thickness in this area as shown at 10 in FIGS. 3 and 3A.

Figure 3:
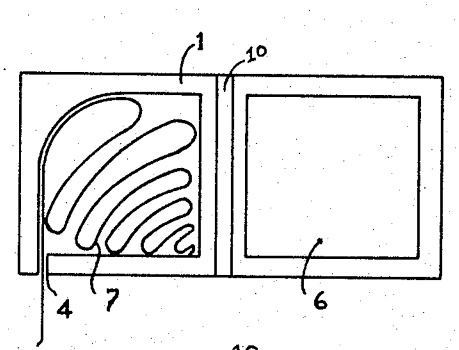
FIG. 3A is a plan view of the embodiment shown in FIG. 3.
Figure 3A:
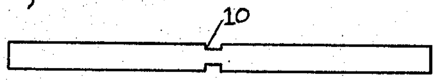

In the embodiment shown in FIG. 3, a single passage 4 is again provided for the introduction and exit of the tape 3, but the latter, instead of being wound in concentric turns, is stored meander-fashion or concertina-fashion as at 7.

Figure 4:
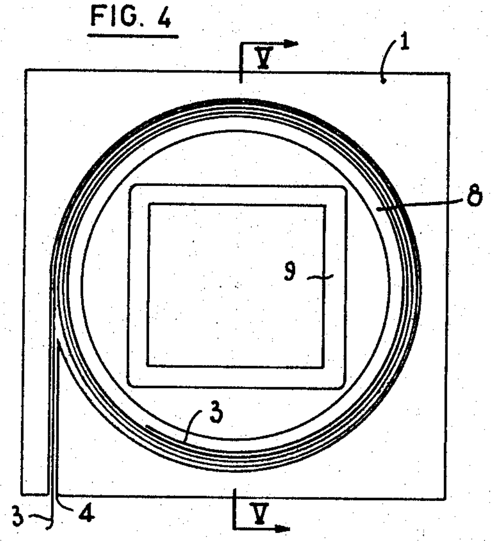
FIG. 4 is an elevational view of another embodiment.
Figure 5:
FIG. 5 is a sectional elevational view taken on line V—V in FIG. 4.

In the embodiment shown in FIGS. 4 and 5, the housing for the tape is in the form of an annular chamber 8 surrounding the housing or aperture 9 for the transparency. The chamber 8 communicates with the exterior of the support frame through a passage 4 for the introduction and exit of the recording tape.

What I claim is:

1. A support frame comprising a body having a first aperture of rectangular shape for supporting a film transparency therein, and a second aperture of circular shape for supporting a roll of material capable of having sound recorded thereon, said body having a passage extending from said second aperture and opening externally of the body to enable reeling and unreeling of the roll of material, said body having a row of perforations separating the apertures inhibiting transfer of heat, said passage being tangential with respect to said second aperture and disposed at a remote position relative to said first aperture.

2. A frame to support transparencies for projection comprising an elongated body, aperture means in said body for supporting a transparency, and means in said body defining a hollow support for a recording band, said body having a narrow slot defining a linear passage which opens tangentially into said hollow support and externally of the body to permit both entry and exit of a free length of the band, said support and passage being arranged in said body to enable the recording band to be freely inserted and removed from the housing externally of the frame, said hollow support and aperture means being disposed in spaced longitudinal relation in said body.

3. A frame as claimed in claim 2, wherein said support for the band is substantially circular.

4. A frame as claimed in claim 2 wherein said body comprises means between the support and the aperture means for impeding transfer of heat therebetween.

5. A support frame according to claim 2, wherein said support for the recording band is of a shape such that the band is housed therein meander-fashion.

6. A support frame according to claim 4, wherein the heat impeding means comprises perforations in the body between said support and said aperture means.

7. A support frame according to claim 4, wherein the heat impeding means comprises a portion of reduced thickness of the body between said support and said aperture means.

References Cited

UNITED STATES PATENTS

| | | | |
|---|---|---|---|
| 3,076,279 | 2/1963 | Afton | 88—26 |
| 3,176,580 | 4/1965 | Metz | 88—28 |
| 3,296,925 | 1/1967 | Yamamoto | 88—26 |

NORTON ANSHER, *Primary Examiner.*

RICHARD A. WINTERCORN, *Assistant Examiner.*